UNITED STATES PATENT OFFICE.

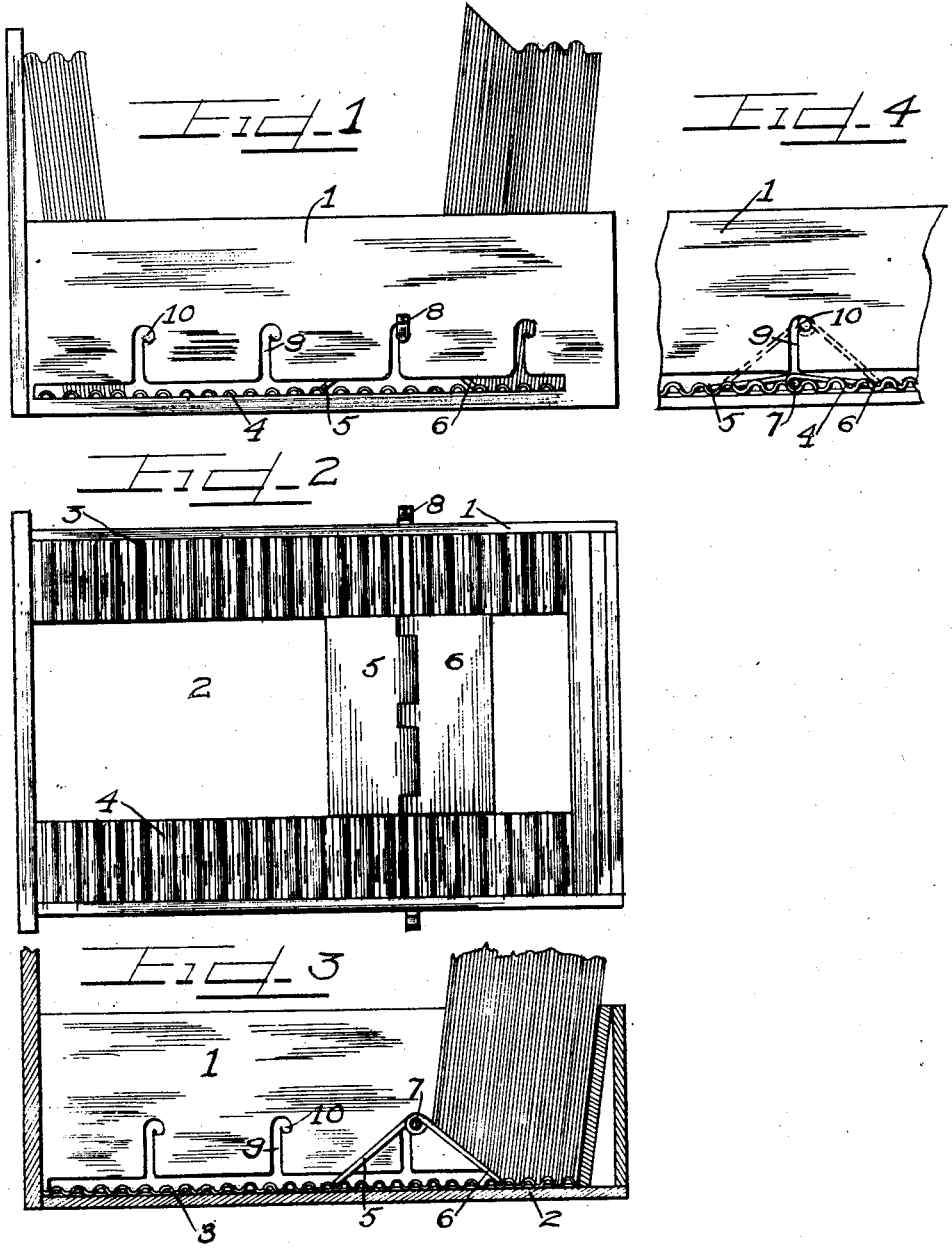

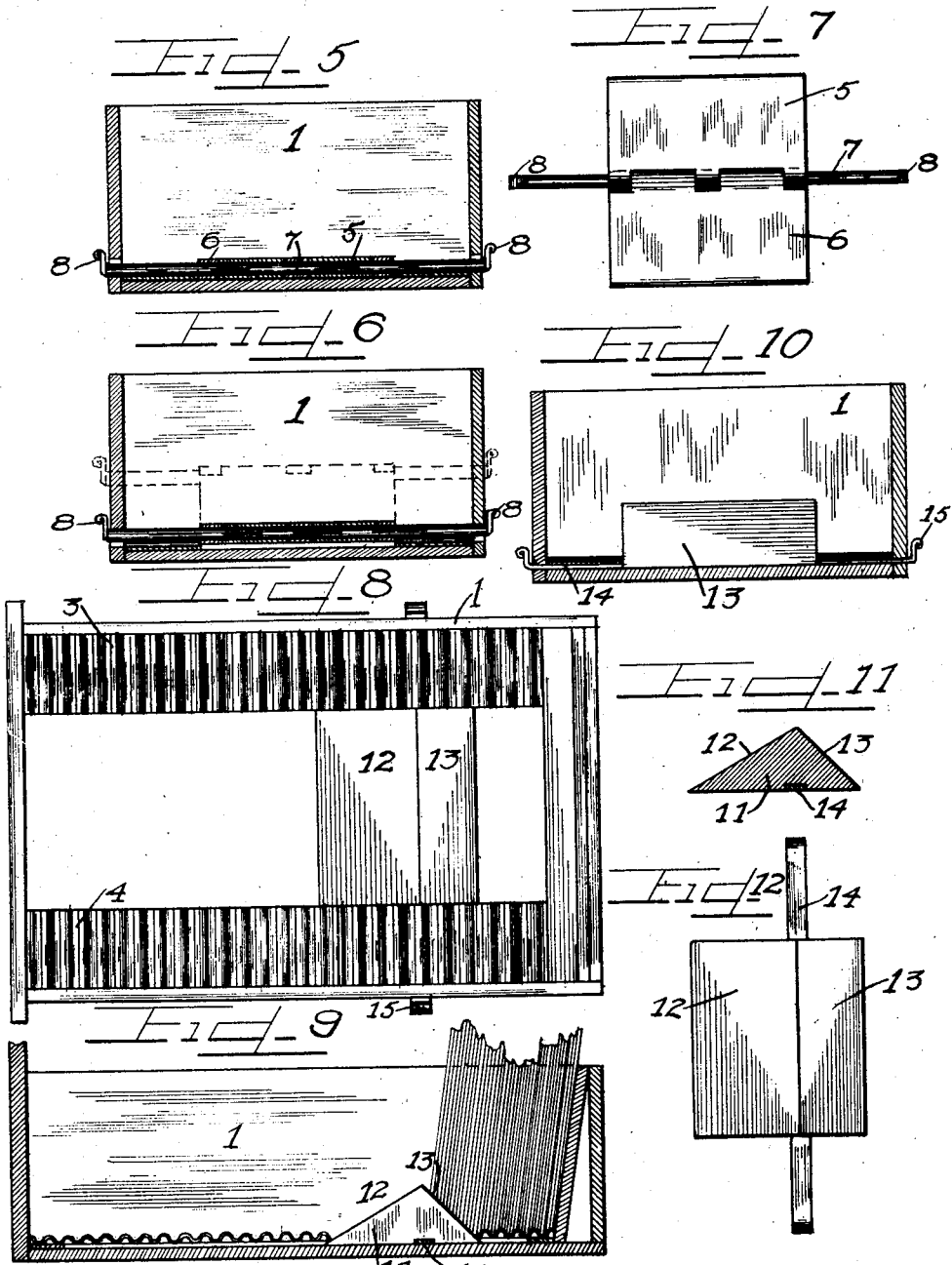

CHARLES R. FARGO, OF CHICAGO, ILLINOIS, ASSIGNOR TO WILSON-JONES LOOSE-LEAF COMPANY, A CORPORATION OF ILLINOIS.

LEAF-UPSETTING DEVICE.

1,405,993.     Specification of Letters Patent.     Patented Feb. 7, 1922.

Application filed December 12, 1917. Serial No. 206,736.

*To all whom it may concern:*

Be it known that I, CHARLES R. FARGO, a citizen of the United States, and a resident of the city of Chicago, in the county of Cook and State of Illinois, have invented certain new and useful Improvements in Leaf-Upsetting Devices; and I do hereby declare that the following is a full, clear, and exact description of the same, reference being had to the accompanying drawings, and to the numerals of reference marked thereon, which form a part of this specification.

This invention relates to improvements in a leaf upsetting device and is particularly adapted for use in connection with filing boxes and drawers. Heretofore, much difficulty has been experienced in extracting loose sheets from a drawer or file as the top edges lie practically in a horizontal plane and require much fingering in separating any leaf or successive leaves from the mass of leaves. Also, much inconvenience is caused by the leaves that remain in the file after a bunch has been removed, by falling forwardly and slipping or curling from the bottom, making them difficult to handle.

It is an object of my invention to provide a leaf upsetting device which may be adjusted to any position in the file below the leaves and which, upon actuation thereof, upsets the leaves at the desired point in such a manner that the forward leaves are each upset a slight distance above the immediate next succeeding leaf, permitting each leaf to be quickly and separately fingered.

It is furthermore an object of my invention to provide an upsetting device for elevating a bunch of loose sheets in such a manner that each leaf has a different point of elevation with the outer leaf having the greatest degree of upward projection, and the succeeding leaves being successively stepped down so that the outer leaf is in position to be readily engaged or fingered.

It is an important object of my invention to provide an upsetting device for the purpose specified which may be upset and retained in the upset position for any length of time, and which, when not in use, lies flat under the leaves and is concealed out of the way.

Other and further important objects of this invention will be apparent from the disclosures in the specification and drawings.

The invention (in a preferred form) is illustrated in the drawings and hereinafter more fully described.

On the drawings:

Figure 1 is a side elevation of a filing drawer provided with a device embodying the principles of my invention.

Figure 2 is a top plan view thereof.

Figure 3 is a longitudinal section taken through the drawer.

Figure 4 is an enlarged detail showing the upsetting device resting on the bottom of the drawer.

Figure 5 is a section taken transversely through the drawer along the shaft for the upsetting device.

Figure 6 is a similar section illustrating the shaft riding over the top of one of the corrugations.

Figure 7 is a plan view of the upsetting device detached.

Figure 8 is a top plan view of a modified form of device.

Figure 9 is a longitudinal section taken through the file drawer with parts in elevation.

Figure 10 is a transverse section taken through the file on one side of the upsetting device.

Figure 11 is a section taken through the upsetting device.

Figure 12 is a plan view of the upsetting device.

As shown on the drawings:

The reference numeral 1, indicates a file or drawer which comprises sides, end members, and a bottom. Secured on the bottom 2, along each side, is a corrugated strip of metal 3—4, providing an alley or passage therebetween in which the upsetting device is adapted to move. Said upsetting device comprises two sections 5 and 6, which are hinged to a shaft or pintle bolt 7, which shaft extends over the corrugated members 3 and 4, and projects through longitudinal slots in the side walls of the file or drawer, said slots being of such width as to permit the shaft riding over the top of the corrugations, as shown in Figure 6. On each end of the shaft is a finger member 8, and at stated intervals apart, slots 9, extend upwardly from the longitudinal slots and terminate in rests or notches 10, in which the ends of the shaft 7, engage when in upset position.

In the construction shown in Figures 8 to 12, inclusive, the file 1, and corrugated members 3 and 4, are the same as before described. Between the corrugated members, a triangular block 11, is engaged, having inclined walls 12 and 13, which may be of any desired pitch of inclination. Secured to the upset block 11, is a strap or bar 14, of metal, which extends beneath the corrugated members 3 and 4, and projects outwardly through longitudinal slots in the side walls, as shown in Figure 10. The ends 15, of the strap, are shaped to be engaged by the fingers for adjusting the upsetting block.

The operation is as follows:

In the construction shown in Figures 1 to 7, the upset device is shifted along the bottom of the file until it is below the bunch of leaves that it is desired to inspect or post. When in this position, the shaft is elevated in the suitable slot 9, and shifted into the notches 10, to support the same elevated. Elevation of this shaft, of course operates the upsetting device, as shown in Figure 3, in which position the walls 5 and 6, are angularly directed with the apex at the top. Of course, the length of slots 9, determine the angle of inclination of the upset sections, and obviously this may be varied to suit any requirement to either upset leaves more or less, as desired. When through with the upsetting device, the shaft is lowered, which collapses the sections 5 and 6, to lie substantially flat beneath the leaves and in this position the device can be readily shifted to any position in the file.

In the other construction shown in Figures 8 to 12, the block is shifted to any position, as is readily understood, to upset any bunch of leaves, but in this case the leaves must ride over the top of the block and are upset to this extent. Other than this, the operation is as before described in respect to the results produced. If the drawer is entirely filled and not only partially so, as shown in Figures 1 and 3, the upset leaves would be on both sides of the upsetting device instead of only one as shown, thus causing the leaves to be upset in two directions.

As clearly shown in both Figures 3 and 9, the lower edges of the sheets normally rest in the corrugations of the metal strips 3—4, to prevent sliding or slipping of said sheets.

Many details of construction may be varied and numerous changes may be made without departing from the principles of this invention, and I therefore do not purpose limiting the patent granted otherwise than necessitated by the prior art.

I claim as my invention:

1. In a device of the class described, a filing drawer, corrugated members secured to the bottom thereof, a pair of hinged plates between said members, means for adjusting the plates to oppositely incline them, and means for retaining the plates in inclined position.

2. In a device of the class described, a filing drawer, an upsetting member adjustable along the bottom of the drawer, means for moving the upsetting member into upsetting position to upset leaves in two directions, said member being adapted to normally lie substantially flat below the leaves.

3. In a device of the class described, a filing drawer, an upsetting member adjustable along the bottom of the drawer, means for actuating the upsetting member into upsetting position to upset leaves, said member being adapted to normally lie below the leaves, and means for holding the member in upset position.

4. In a filing drawer, an upsetting device slidable along the bottom of the drawer, said device in operative position having two angularly inclined surfaces.

5. In a filing drawer, an upsetting device slidable along the bottom of the drawer, said device having two angularly inclined surfaces when in upset position and adapted to lie collapsed when not in upset position.

6. In a device of the class described, a pair of plates, and means hinging the same together adapted to elevate the plates at the hinged part forming inclined supporting surfaces for loose leaves.

7. In a device of the class described, a filing drawer, corrugated members therein to permit sheets to normally rest thereon to hold said sheets from slipping, and means movably disposed in said drawer between said members for upsetting said sheets at any position in the drawer to permit separate fingering of said sheets.

8. A filing drawer, corrugated means therein for normally holding leaves from sliding, and means adjustable along the bottom of said drawer for upsetting said leaves in two directions to permit quick and separate fingering of said leaves.

9. In a device of the class described, a filing drawer, an upsetting member adjustable along the bottom of the drawer, means for actuating the upsetting member into upsetting position to upset leaves, said member being adapted to normally lie substantially flat below the leaves, and means for holding the member in upset position.

10. In a filing drawer, an upsetting device slidable along the bottom of the drawer said device having two angularly inclined surfaces when in upset position and adapted to lie substantially flat when not in upset position.

In testimony whereof I have hereunto subscribed my name in the presence of two subscribing witnesses.

CHARLES R. FARGO.

Witnesses:
EARL M. HARDINE,
CHARLES W. HILLS, Jr.